United States Patent
Kong (10) Patent No.: US 8,881,874 B2
(45) Date of Patent: Nov. 11, 2014

(54) DISK BRAKE

(71) Applicant: Mando Corporation, Gyeonggi-do (KR)

(72) Inventor: Young Hun Kong, Gyeonggi-do (KR)

(73) Assignee: Mando Corporation, Gyeonggi-Do (KR)

( * ) Notice: Subject to any disclaimer, the term of this patent is extended or adjusted under 35 U.S.C. 154(b) by 127 days.

(21) Appl. No.: 13/750,279

(22) Filed: Jan. 25, 2013

(65) Prior Publication Data

US 2013/0186716 A1 Jul. 25, 2013

(30) Foreign Application Priority Data

Jan. 25, 2012 (KR) .................. 10-2012-0007211

(51) Int. Cl.
*F16D 65/56* (2006.01)
*F16D 65/18* (2006.01)
*F16D 65/68* (2006.01)
*F16D 121/04* (2012.01)

(52) U.S. Cl.
CPC ............... *F16D 65/68* (2013.01); *F16D 65/18* (2013.01); *F16D 65/567* (2013.01); *F16D 2121/04* (2013.01)
USPC ....................................... 188/71.8; 188/72.4

(58) Field of Classification Search
CPC ....... F16D 55/226; F16D 55/18; F16D 65/56; F16D 65/567; F16D 65/66
USPC ............... 188/71.7–71.9, 72.8, 72.4
See application file for complete search history.

(56) References Cited

U.S. PATENT DOCUMENTS

| 4,085,830 | A | * | 4/1978 | Bottoms et al. | 188/196 D |
| 4,394,890 | A | * | 7/1983 | Kleinhagen, Jr. | 188/71.9 |
| 4,712,654 | A | * | 12/1987 | Temple et al. | 188/71.8 |
| 4,712,655 | A | * | 12/1987 | Sauvee | 188/196 D |
| 5,868,225 | A | * | 2/1999 | Hulliger | 188/72.4 |
| 6,651,784 | B1 | * | 11/2003 | Barbosa et al. | 188/71.9 |
| 8,177,038 | B2 | * | 5/2012 | Watada et al. | 188/72.8 |
| 8,443,949 | B2 | * | 5/2013 | Mahoudeaux et al. | 188/368 |
| 2011/0155520 | A1 | | 6/2011 | Takahashi et al. | |

FOREIGN PATENT DOCUMENTS

| DE | 4226143 A1 | * | 2/1994 |
| EP | 44007 A1 | * | 1/1982 |
| GB | 2012012 A | * | 7/1979 |
| KR | 1020110029267 A | | 3/2011 |
| WO | WO 9532371 A1 | * | 11/1995 |

* cited by examiner

*Primary Examiner* — Anna Momper
(74) *Attorney, Agent, or Firm* — Ohlandt Greeley Ruggiero & Perle L.L.P.

(57) ABSTRACT

Disclosed herein is a disc brake which may improve restoration of a piston which occurs when braking operation is terminated.

The disc brake having a carrier and a caliper housing includes an adjuster installed inside the piston to maintain the pad plates at a distance from the disc, a pull-rod installed in the cylinder, a front portion thereof being screwed to the adjuster and a rear portion thereof being provided with a flange extending toward an inner circumferential surface of the cylinder, a support member coupled with a rear wall of the cylinder to support the pull-rod and seal an inside of the cylinder, a spring case adapted to have one end fixed to the support member and form a predetermined accommodating space, and an elastic member arranged in the accommodating space of the spring case to return the piston to an original position thereof.

11 Claims, 7 Drawing Sheets

DISK BRAKE

CROSS-REFERENCE TO RELATED APPLICATION(S)

This application claims the benefit of Korean Patent Application No. 2012-0007211, filed on Jan. 25, 2012 in the Korean Intellectual Property Office, the disclosure of which is incorporated herein by reference.

BACKGROUND

1. Field

Embodiments of the present invention relate to a disc brake which may improve restoration of a piston which occurs when braking operation is terminated.

2. Description of the Related Art

A disc brake is a device that is generally used to slow a vehicle to a stop by forcibly pressing friction pads against both sides of a disc rotating together with a wheel of the vehicle.

To reduce brake drag that is caused by continuous contact between the disc and the friction pads after the brake pedal is released, two solutions may be considered for such disc brakes. One solution is to retract the piston by using a seal and a roll-back chamfer. The other solution is to retract the piston using a compression spring for pad plates, which are pressed against the disc.

Figure 1:
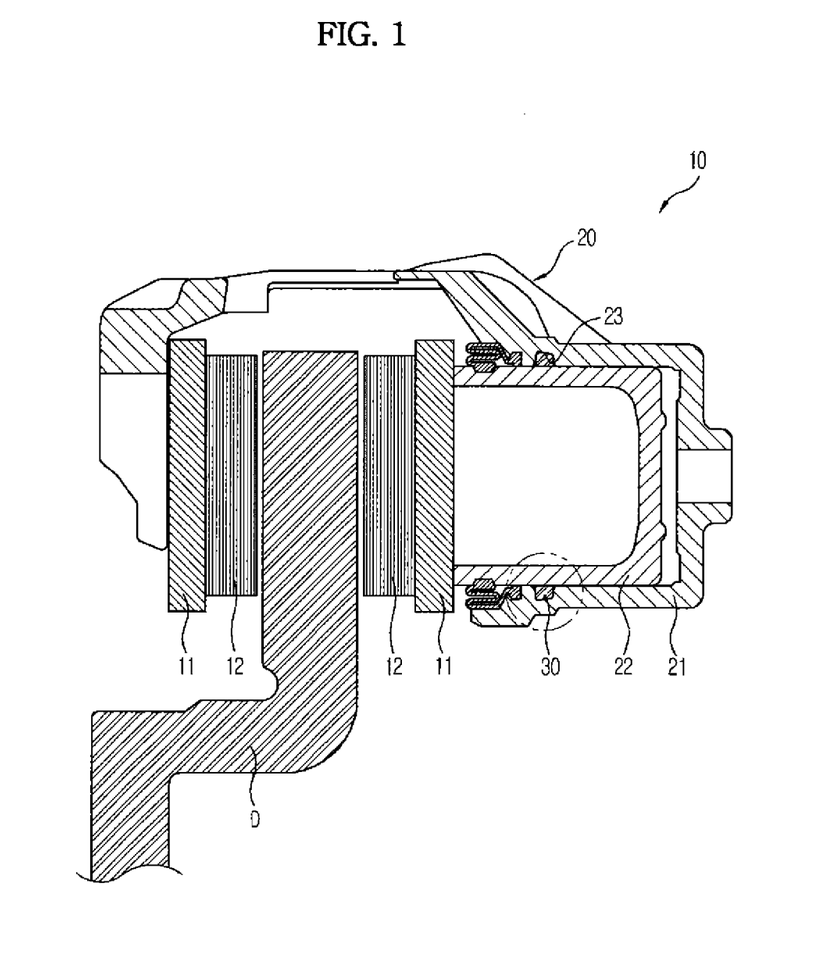
FIG. 1 is a cross-sectional view illustrating a conventional disc brake.
Figure 2:
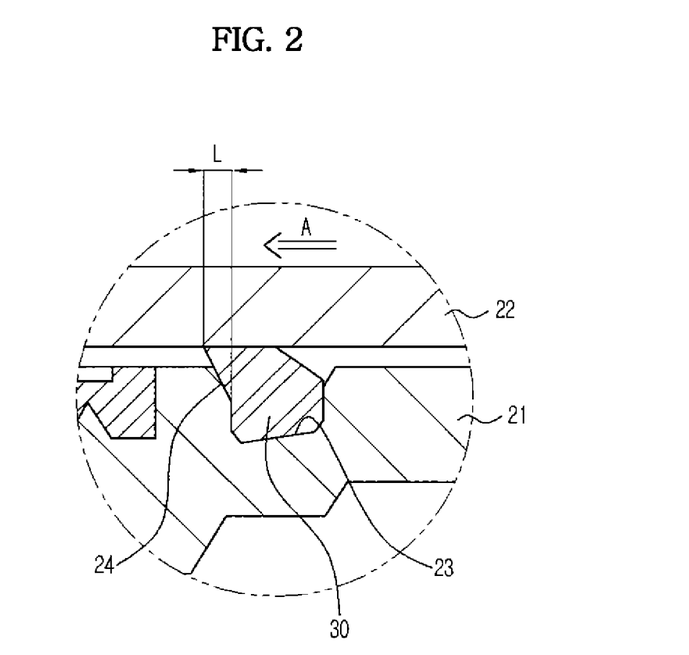
FIG. 2 is a partially enlarged view illustrating operation of the conventional disc brake.

FIG. 1 is a cross-sectional view illustrating a conventional disc brake, and FIG. 2 is a view showing the piston retracted by using a seal and a roll-back chamfer.

As shown in FIGS. 1 and 2, a disc brake 10 includes a pair of pad plates 11 to generate braking force by being pressed against a disc D, a carrier (not shown) to support the pair of pad plates 11, a caliper housing 20 installed at the carrier and provided with a piston 22 slidably installed in a cylinder 21 to apply pressure to the pair of pad plates 11, and a seal interposed between an inner surface of the cylinder 21 and an outer surface of the piston 22 of the caliper housing 20. The seal 30 serves to seal the space between the inner surface of the cylinder 21 and the outer surface of the piston 22 to ensure that brake oil does not escape and to allow the piston 22 to be moved forward in the direction of arrow A, as shown in FIG. 2, for implementation of braking and moved back to an original position thereof by resilience of the seal 30, by which the seal 30 recovers an original shape thereof, when the braking pressure is released.

The seal 30 is formed in a shape of a ring to be inserted into a circular roll-back chamfer 23 provided in the inner surface of the cylinder 21, and has a quadrilateral cross section. In addition, the roll-back chamfer 23 to accommodate the seal 30 is provided with a slope 24 at a portion of its opening facing the direction opposite to the direction (arrow A) in which braking is performed to allow the seal 30 to be deformed when the piston 22 is moved forward in the direction of braking, as shown in FIG. 2.

When the piston 22 is moved forward to perform braking, the seal 30 is deformed as shown in FIG. 2. When the braking pressure is released, the seal 30 returns in the direction opposite to arrow A to an original state thereof shown in FIG. 1. Accordingly, the piston 22 is moved back to an original position thereof by the resilience of the seal 30. This action is referred to as roll-back. The return distance of the piston 22 depends on the deformed width (L) of the seal 30.

However, in the conventional disc brake 10, since the side of the seal 30 facing the direction in which braking is performed is a flat surface roughly perpendicular to the outer surface of the piston 22 as shown in FIG. 1, and the deformed width (L) of the seal 30 is limited as shown in FIG. 2, and thus the return distance of the piston 22 may be short. That is, the deformation of the conventional seal 30 is small, and thus increasing the return distance of the piston 22 may be limited. If the return distance of the piston 22 is short, the friction pads 12 attached to the pad plates 11 may not be sufficiently separated from the disc when the braking pressure is released, resulting in wear of the friction pads 12. That is, high drag may be caused depending on the amount of roil-back given by the machining allowance of the cylinder 21 and the frictional force generated between the seal 30 and the piston 22.

Further, when the piston 22 returns to an original position thereof, the piston 22 may undergo knock-back, which refers to a phenomenon in which the piston 22 moves forward again by elastic force of the seal 30 after moving in the return direction. In addition, when the braking pressure is released, the caliper housing 20 slidably moved from the carrier returns to an original position thereof along with elastic return of the piston 22 by the seal 30. But when the caliper housing 20 is moved leftward in this process, the piston 22 may undergo back slip, that is, slipping in the direction of forward (leftward) movement of the piston 22, which is caused by the seal 30 installed at the roll-back chamfer.

Meanwhile, when a compression spring (not shown) is used to move the piston 22 backward, it is installed at the pad plate 11, which is pressed against the disc D, to provide elastic force in the direction opposite to that of pressing the pad plate 11 against the disc D.

However, when the compression spring is used, the amount of roll-back increases as the friction pad 12 is worn, resulting in poor initial braking feeling. Further, excessive roll-back of the piston 22 caused by the compression spring may cause a sinking brake pedal.

SUMMARY

Therefore, it is an aspect of the present invention to provide a disc brake which may arrange a low-pressure spring and a high-pressure spring to operate according to the low pressure and high pressure, thereby providing improved restoration of a piston when the brake is released and allowing the restoring force of a piston to ensure a space between the disc and the friction pads.

Additional aspects of the invention will be set forth in part in the description which follows and, in part, will be obvious from the description, or may be learned from practice of the invention.

In accordance with one aspect of the present invention, a disc brake having a carrier at which a pair of pad plates is installed to be movable forward and backward and a caliper housing which is installed on the carrier and provided with a cylinder in which a piston is installed to be movable forward and backward by hydraulic brake pressure includes an adjuster installed inside the piston to prevent the pad plates from withdrawing from a disc and maintain the pad plates at a distance from the disc, a pull-rod installed in the cylinder, a front portion thereof being screwed to the adjuster and a rear portion thereof being provided with a flange extending toward an inner circumferential surface of the cylinder, a support member coupled with a rear wall of the cylinder to support the pull-rod and seal an inside of the cylinder, a spring case adapted to have one end fixed to the support member and form a predetermined accommodating space, and an elastic member arranged in the accommodating space of the spring case to return the piston to an original position thereof, wherein the elastic member includes a low-pressure spring arranged in the spring case, with one end thereof supported on an inner side surface of the spring case and the other end thereof supported by the flange to provide elastic force in a direction of movement of the piston and a high-pressure spring arranged in the spring case to be spaced a distance from the low-pressure spring, with one end thereof supported on the inner side surface of the spring case and the other end thereof supported by the support member to provide elastic force in the direction of movement of the piston.

A leading end surface of the flange supporting the low-pressure spring and a leading end surface of the support member supporting the high-pressure spring may be arranged in a stepped manner to provide a step portion that defines a gap between the low-pressure spring and the high-pressure spring in a longitudinal direction.

The adjuster may be provided with a head portion contacting the piston and a rod adapted to extend from the head portion and have a threaded outer circumferential surface, and the piston is formed with a hollow, cylindrical interior having a cup shape, and a cylindrical inserting portion protruding to surround the head portion of the adjuster to form a first concave portion at a center of the inserting portion and a second concave portion between the inserting portion and an inner side surface of the piston.

Washers may be installed respectively on a rear wall of the head portion of the adjuster and an inner side surface of the inserting portion, and a washer spring may be provided between the washers to press the adjuster against the piston with an elastic force of the washer spring.

The support member may be provided with a seating groove at which the flange is seated.

The pull-rod may be provided with a plurality of supporting protrusions adapted to be equally spaced from each other along an outer circumferential surface of the flange and protrude in a radial direction of the pull-rod, and the seating groove of the supporting member is provided with a plurality of support grooves corresponding to the supporting protrusions at positions corresponding to the supporting protrusions.

Leading end surfaces of the supporting protrusions and a leading end surface of the support member supporting the high-pressure spring are arranged in a stepped manner such that the leading end surface of the support member protrudes further in a direction of forward movement of the piston than the leading end surfaces of the supporting protrusions.

The flange may be provided with a recess recessed to support the low-pressure spring.

An outermost leading end of the support member may be provided with a projection, wherein an anti knock-back spring to prevent knock-back is installed between the projection and the second concave portion.

A distance between threads of the adjuster and the pull-rod which are screw-coupled with each other may decrease to allow the adjuster to be closely combined with the pull-rod.

A hydraulic duct to receive hydraulic brake pressure to be applied to the piston may be provided at one end of the caliper housing.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings. It should be understood that the terms used in the specification and appended claims should not be construed as limited to general and dictionary meanings but should be construed based on the meanings and concepts according to the spirit of the present invention on the basis of the principle that the inventor is permitted to define appropriate terms for best explanation. The preferred embodiments described in the specification and shown in the drawings are merely illustrative and are not intended to represent all aspects of the invention, such that various equivalents and modifications may be made without departing from the spirit of the invention.

Figure 3:
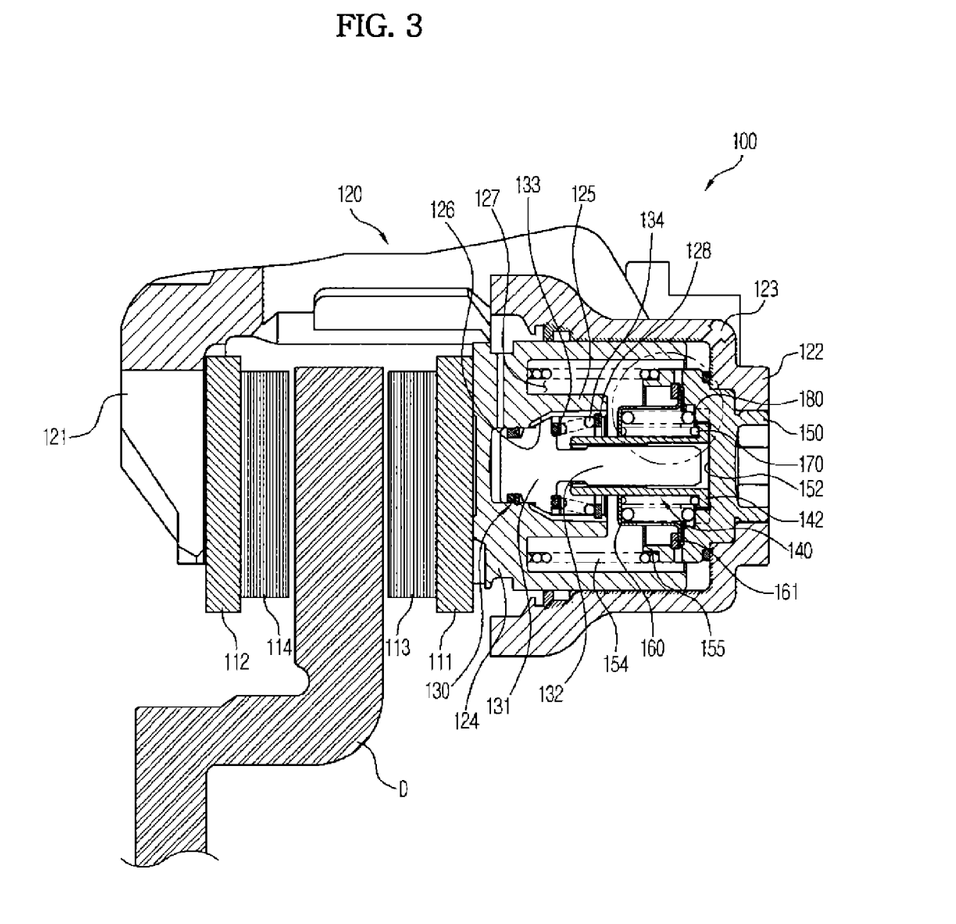
FIG. 3 is a cross-sectional view illustrating a disc brake according to an exemplary embodiment of the present invention.

FIG. 3 is a cross-sectional view illustrating a disc brake according to an exemplary embodiment of the present invention With reference to FIG. 3, a disc brake 100 includes a caliper housing 120 at which a piston 124 is installed to be moved forward and backward by hydraulic brake pressure, a carrier (not shown) fixed to a vehicle body and coupled with the caliper housing 120 to allow the caliper housing 120 to be slidable, a pair of pad plates 111 and 112 installed at the carrier to be spaced a distance apart from each other and slidable toward a disc D rotating together with a wheel to be pressed against the disc D, an adjuster 130 to prevent the pad plates 111 and 112 from becoming farther from the disc D and to maintain the pad plates 111 and 112 at a distance from each other, a pull-rod 140 screw-coupled with the adjuster 130, a support member 150 coupled with the caliper housing 120 to support the pull-rod 140, a spring case 160 forming a predetermined accommodating space between the support member 150 and the pull-rod 140, and an elastic member including a low-pressure spring 170 and a high-pressure spring 180.

The carrier (not shown) is fixed to a knuckle in the vehicle body through mounting bolts (not shown), and the caliper housing 120 is slidably coupled to opposite ends of the carrier through a guide rod (not shown). In addition, the pad plates 111 and 112 are mounted at the center of the carrier to be spaced a distance apart from each other and slidable in the directions in which they face each other.

The pad plates 111 and 112 are divided into an inner pad plate 111 disposed to adjoin the piston 124, which will be described below, and having an inner side to which a friction pad 113 is attached, and an outer pad plate 112 disposed to adjoin a finger 121, which will be described below, and having an inner side to which a friction pad 114 is attached. The disc D is formed in a shape of a circular plate rotating together with a wheel (not shown), and rotates with a portion thereof interposed between the pad plates 111 and 112.

The caliper housing 120 includes the finger 121 to operate the outer pad plate 112 and a cylinder 122 provided with a hydraulic duct 123 through which hydraulic brake pressure is transferred.

The finger 121 is formed to bend downward from the front portion of the caliper housing 120 to surround the outer pad plate 112 at the outside of the outer pad plate 112. Accordingly, when braking is applied, the caliper housing 120 is slidably moved rightward from the carrier to cause the outer pad plate 112 to be pushed toward the disc D and pressed against the disc D by the finger 121.

The cylinder 122 is arranged at the rear side of the caliper housing 120 to allow hydraulic brake pressure generated in a master cylinder (not shown) to be transferred, and the piston 124 is installed in the cylinder 122 to be movable forward and backward. That is, the piston 124 installed in the cylinder 122 is moved forward and backward within the cylinder 122 by the hydraulic brake pressure. Installed at the rear side of the cylinder 122 is the support member 150 to seal the inside of the cylinder 122 and support the pull-rod 140, which will be described below.

The piston 124 is arranged to have a shape of a cup open at one side thereof and provided with a cylindrical inserting portion 125 formed at the inner center of the piston 124 to protrude toward the open portion of the piston 124. A first concave portion 126 is formed at the center of the inserting portion 125, and a second concave portion 127 is formed between the inserting portion 125 and the inner surface of the piston 124. A head portion 131 of the adjuster 130, which will be described below, is inserted into the first concave portion 126, and an anti knock-back spring 154 is inserted into the second concave portion 127.

The adjuster 130 includes a head portion 131 installed in the piston 124 inserted into the cylinder 122 to contact the piston 124, and a rod 132 extending from the head portion 131 and provided with threads 132a on the outer circumferential surface thereof. As described above, the head portion 131 is inserted into the first concave portion 126 formed in the inserting portion 125 of the piston 124 to contact the first concave portion 126.

Such an adjuster 130, which serves to prevents the space between the disc D and the pad plates 111 and 112 from being widened as the friction pads 113 and 114 attached to the pad plates 111 and 112 are worn and keep the distance therebetween constant, has washers 128 and 133 installed respectively at the surface of the inner side of the inserting portion 125 of the piston 124 and the rear wall of the head portion 131 and a washer spring 134 arranged between the washers 128 and 133. That is, the adjuster 130 is pressed against one inner side of the piston 124, i.e., the first concave portion 126 by the washer spring 134 installed between the inserting portion 125 and the head portion 131. As the washer spring 134 presses the adjuster 130 toward the leading end of the piston 124, the adjuster 130 is always in contact with the piston 124 even when the friction pads 113 and 114 of the pad plates 111 and 112 are worn out due to friction between the disc D and the friction pads 113 and 114 and the position of the piston 124 is shifted toward the inner pad plate 111.

The rear side of the adjuster 130, i.e., the rod 132 is screw-coupled with the pull-rod 140 installed in the cylinder 122. The pull-rod 140 has a core formed in the shape of a hollow and threads 140a arranged on the inner circumferential surface thereof to allow the pull-rod 140 to be screw-coupled with the adjuster 130, and is also provided, on the rear portion thereof, with a flange 142 extending toward the inner circumferential surface of the cylinder 122. The pull-rod 140 is seated at and supported by a seating groove 152 of the support member 150, which will be described below, and a spring case 160 is installed between the pull-rod 140 and the support member 150 to form a predetermined accommodating space.

One side of the spring case 160 is fixed to the support member 150 by a snap ring 161, and elastic members to return the piston 124 to an original position thereof, i.e., a low-pressure spring 170 and a high-pressure spring 180 are installed at the spring case 160. One end of the low-pressure spring 170 is supported by the inner side surface of the spring case 160 and the other end thereof by the flange 142. The high-pressure spring 180 is spaced a distance apart from the low-pressure spring 170. One end of the high-pressure spring 180 is supported by an inner side surface of the spring case 160 and the other end thereof by the leading end surface of the support member 150 provided with the seating groove 152. Here, the leading end surfaces of the flange 142 and the support member 150 supporting the low-pressure spring 170 and high-pressure spring 180 are arranged in a stepped manner, forming a step portion, which creates a gap G between the low-pressure spring 170 and the high-pressure spring 180 in the longitudinal direction (see FIG. 5). Installation of the low-pressure spring 170 and the high-pressure spring 180 with the gap G formed therebetween in the longitudinal direction will be described again later in the present application.

As the pull-rod 140 is screw-coupled with the adjuster 130, the adjuster 130 is movable in the longitudinal direction of the pull-rod 140. That is, when the piston 124 moves due to wear of the friction pads 113 and 114, the adjuster 130, which is allowed to closely contact the piston 124 by the washer spring 134, rotates to move from the pull-rod 140 by the traveling distance of the piston 124 to stay in close contact with the piston 124. Accordingly, the distance between the disc D and the pad plates 111 and 112 to which pressure is applied by the piston 124 is kept constant.

Figure 6:
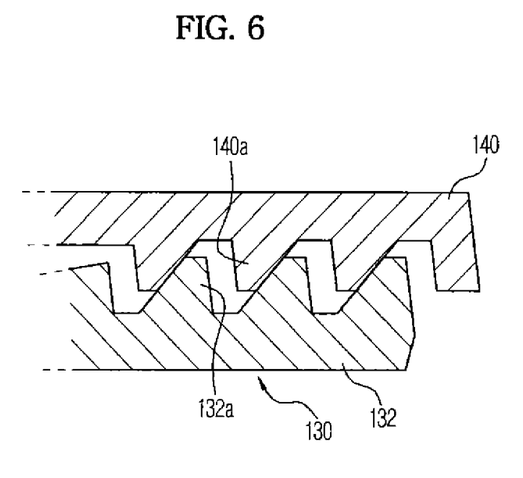
FIG. 6 is a partial cross-sectional view illustrating screw-coupling of an adjuster with the pull-rod according to the illustrated embodiment of the present invention.

Meanwhile, when the piston 124 is moved forward by hydraulic brake pressure, the adjuster 130 coupled with the piston 124 is moved forward together with the piston 124, and the pull-rod 140 screw-coupled with the adjuster 130 is also moved forward. Thereby, the distance between the threads 132a and 140a of the adjuster 130 and pull-rod 140 screw-coupled with each other decreases. For example, as shown in FIG. 6, a gap that is generally present between the threads 132a and 140a of the adjuster 130 and the pull-rod 140 is reduced as the adjuster 130 is arranged to be pressed in the direction of forward movement of the piston 124 (leftward), and thereby the adjuster 130 and the pull-rod 140 simultaneously move.

Figure 4:
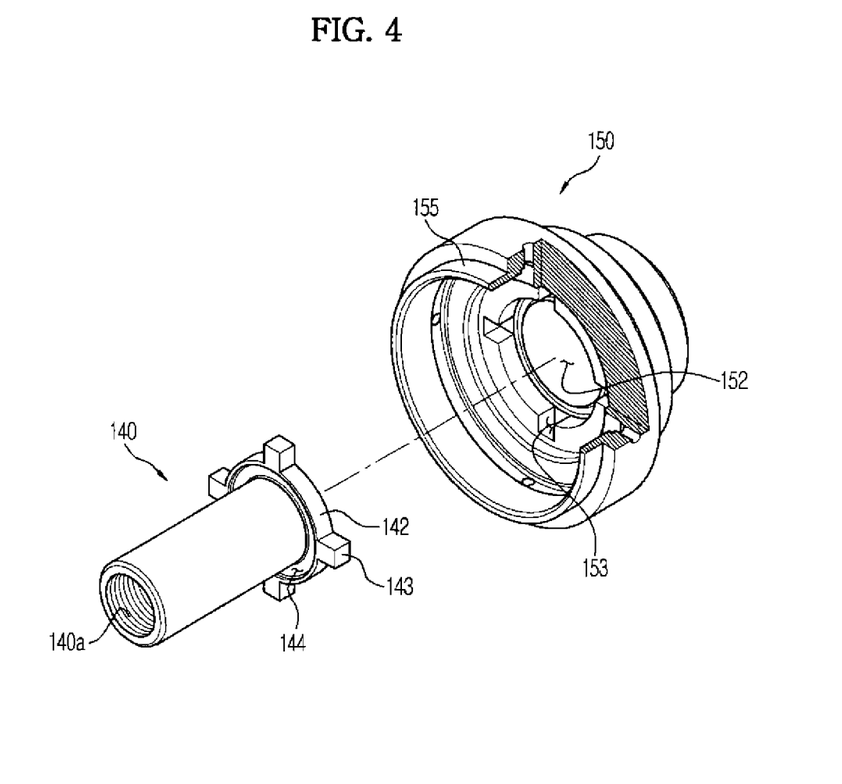
FIG. 4 is a perspective view illustrating a pull-rod arranged at the disc brake according to the illustrated embodiment of the present invention.

In accordance with the illustrated embodiment, the pull-rod 140 is provided with a plurality of supporting protrusions 143 arranged to be equally spaced along the outer circumferential surface of the flange 142 and protrude in a radial direction. The supporting protrusions 143 are provided to press the high-pressure spring 180, which will be described below. The seating groove 152 of the support member 150 is provided with support grooves 153 corresponding to the supporting protrusions 143, at the positions corresponding to those of the supporting protrusions 143. Here, a leading end surface of the supporting protrusion 143 and a leading end surface of the support member 150 having the seating groove 152 is formed, are arranged in a stepped manner. That is, the leading end surface of the support member 150 is arranged to protrude farther in the direction of forward movement of the piston 124 than the leading end surface of the supporting protrusion 143.

Figure 5:
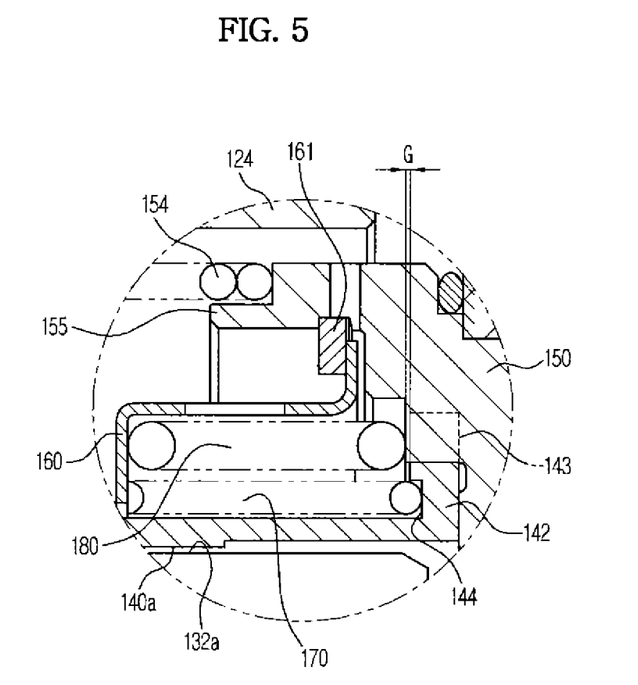
FIG. 5 is a partially enlarged view illustrating a gap formed between the low-pressure spring and the high-pressure spring by steps of a support member and the pull-rod arranged at the disc brake according to the illustrated embodiment of the present invention.

Therefore, as described above, a gap G having a specific width is created between the low-pressure spring 170 and the high-pressure spring 180 by the step portion formed by leading end surfaces. This ensures that a gap is provided between the disc D and the pad plates 111 and 112.

As the structure supporting the low-pressure spring 170 and the high-pressure spring 180 is provided as above, the low-pressure spring 170 is supported by the flange 142 and the high-pressure spring 180 is supported by the support member 150 when the disc brake 100 does not operate. When the brake is applied and the adjuster 130 and the pull-rod 140 are moved according to movement of the piston 124, the low-pressure spring 170 supported by the flange 142 of the pull-rod 140 is first compressed. After the low-pressure spring 170 is compressed by the gap G formed between the low-pressure spring 170 and the high-pressure spring 180, the supporting protrusion 143 supports the high-pressure spring 180 to allow the low-pressure spring 170 and the high-pressure spring 180 to be compressed.

Meanwhile, the flange 142 is provided with a recess 144 arranged to be recessed to stably support the low-pressure spring 170.

In accordance with the illustrated embodiment of the present invention, a projection 155 is provided at an edge of the leading end portion of the support member 150 to allow an anti knock-back spring 154 to be installed between the projection 155 and the second concave portion 127. The anti knock-back spring 154 serves to prevent knock-back of the piston 124, which refers to excessive backward movement of the piston 124 occurring when the piston 124 moves backward.

Figure 7:
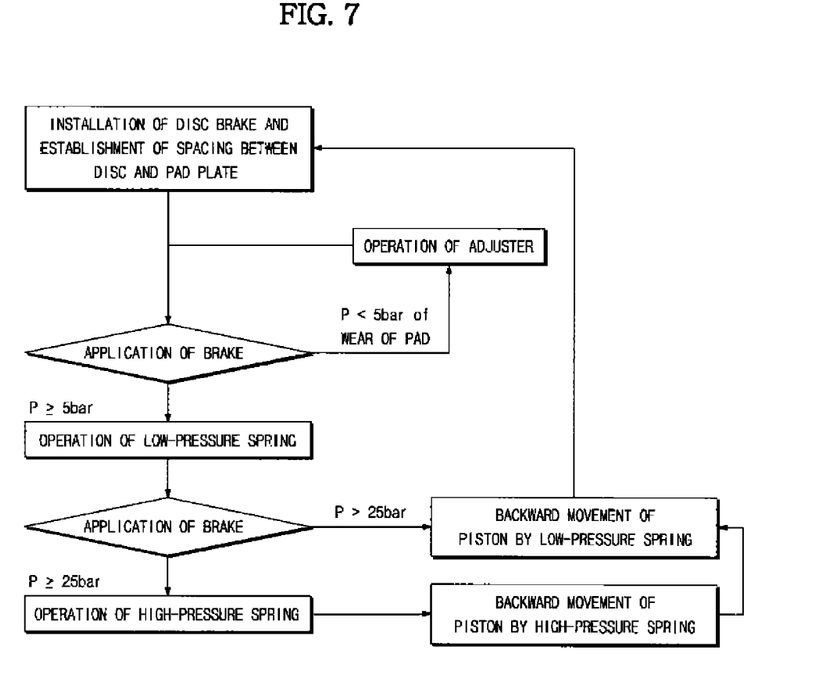
FIG. 7 is a flowchart illustrating operation of the disc brake according to the illustrated embodiment.

Hereinafter, operation of the disc brake 100 as above will be described. The low-pressure spring 170 and the high-pressure spring 180 are installed at the disc brake 100 in order that the low-pressure spring 170 alone is used in braking under the low pressure condition, while the low-pressure spring 170 and the high-pressure spring 180 are both used under the high pressure condition in braking. Hereinafter, operation of the low-pressure spring 170 and the high-pressure spring 180 will be described under the condition of arbitrarily specified low pressure and high pressure. FIG. 7 is a flowchart illustrating the operation of the disc brake 100 as above.

The disc brake 100 in accordance with the illustrated embodiment is first installed in a vehicle. That is, the gap G is formed between the low-pressure spring 170 and high-pressure spring 180 in a longitudinal direction, and thereby a distance between the disc and the pad plates 111 and 112 is ensured.

If the pressure in braking is less than about 5 bar or wear of the friction pads 113 and 114 attached to the pad plates 111 and 112 occurs, the distance between the disc D and the pad plates 111 and 112, i.e., the distance between the disc D and the friction pads 113 and 114 is automatically adjusted by the adjuster 130.

On the other hand, if the pressure in braking is between about 5 bar and about 25 bar, the piston 124 applies pressure to the inner pad plate 111, and thereby the pad 113 attached to the inner pad plate 111 is pressed against the disc D to generate braking force. Here, a person skilled in the art would fully understand that the caliper housing 120 slides from the carrier (not shown) in braking to cause the finger 121 to apply pressure to the outer pad plate 112, and thus a detailed description thereof will be omitted. If the pressure is in the range between about 5 bar and about 25 bar, which is the low pressure condition, the piston 124, the adjuster 130 and the pull-rod 140 are moved, and only the low-pressure spring 170 supported by the flange 142 of the pull-rod 140 is compressed. That is, the pull-rod 140 is moved by the gap G between the high-pressure spring 180 and the low-pressure spring 170 to compress the low-pressure spring 170. Accordingly, when braking is released, the piston 124 is returned to an original position thereof by the low-pressure spring 170.

Next, if the pressure in braking is greater than about 25 bar, which is the high pressure condition, the piston 124, adjuster 130 and pull-rod 140 are moved together, and the low-pressure spring 170 supported by the flange 142 of the pull-rod 140 is compressed. When the low-pressure spring 170 is moved by the gap G between the high-pressure spring 180 and the low-pressure spring 170, the supporting protrusion 143 protruding from the flange 142 supports and compresses the high-pressure spring 180. That is, under the high pressure condition, the low-pressure spring 170 and high-pressure spring 180 are compressed together. Therefore, when braking is released under this condition, the piston 124 is smoothly moved backward by the high-pressure spring 180 and the low-pressure spring 170 without undergoing drag, and after the high-pressure spring 180 becomes supported by the leading end surface of the support member 150, the piston 124 is finally returned to an original position thereof by the low-pressure spring 170.

When the piston 124 is returned to an original position thereof, the anti knock-back spring 154 prevents the piston 124 from moving excessively backward.

The brake pressure generated in braking as above may be measured by a controller (not shown) installed at the disc brake 100. The controller is a commonly used one and thus a detailed description thereof will be omitted.

As is apparent from the above description, a disc brake according to the embodiments of the present invention is provided with a low-pressure spring operating according to low pressure in braking and a high-pressure spring operating according to high pressure, and thus may not only prevent drag by moving the piston backward, but also secure a space between the disc and the pad plates.

In addition, the disc brake according to the embodiments of the present invention may not only address back slip which may occur when braking is released and the caliper housing is returned, but also prevent initial braking sensation from being degraded when the amount of roll-back increases according to wear of the friction pads.

Thereby, wear of the friction pads and noise due to unnecessary friction between the friction pads and the disc may be prevented and normal braking force may be generated by ensuring that the pad plates are spaced a distance apart from the disc.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disc brake having a carrier at which a pair of pad plates is installed to be movable forward and backward and a caliper housing which is installed on the carrier and provided with a cylinder in which a piston is installed to be movable forward and backward by hydraulic brake pressure, the disc brake comprising:

an adjuster installed inside the piston to prevent the pad plates from withdrawing from a disc and maintain the pad plates at a distance from the disc;

a pull-rod installed in the cylinder, a front portion thereof being screwed to the adjuster and a rear portion thereof being provided with a flange extending toward an inner circumferential surface of the cylinder;
a support member coupled with a rear wall of the cylinder to support the pull-rod and seal an inside of the cylinder;
a spring case adapted to have one end fixed to the support member and form a predetermined accommodating space; and
an elastic member arranged in the accommodating space of the spring case to return the piston to an original position thereof,
wherein the elastic member comprises:
a low-pressure spring arranged in the spring case, with one end thereof supported on an inner side surface of the spring case and the other end thereof supported by the flange to provide elastic force in a direction of movement of the piston; and
a high-pressure spring arranged in the spring case to be spaced a distance from the low-pressure spring, with one end thereof supported on the inner side surface of the spring case and the other end thereof supported by the support member to provide elastic force in the direction of movement of the piston.

2. The disc brake according to claim 1, wherein a leading end surface of the flange supporting the low-pressure spring and a leading end surface of the support member supporting the high-pressure spring are arranged in a stepped manner to provide a step portion that defines a gap between the low-pressure spring and the high-pressure spring in a longitudinal direction.

3. The disc brake according to claim 1, wherein:
the adjuster is provided with a head portion adapted to contact the piston and a rod adapted to extend from the head portion and have a threaded outer circumferential surface; and
the piston is formed with a hollow, cylindrical interior having a cup shape, and provided, at a center portion of the inside of the piston, with a cylindrical inserting portion protruding to surround the head portion of the adjuster to form a first concave portion at a center of the inserting portion and a second concave portion between the inserting portion and an inner side surface of the piston.

4. The disc brake according to claim 3, wherein washers are installed respectively on a rear wall of the head portion of the adjuster and an inner side surface of the inserting portion, and a washer spring is provided between the washers to press the adjuster against the piston with an elastic force of the washer spring.

5. The disc brake according to claim 3, wherein an outermost leading end of the support member is provided with a projection,
wherein an anti knock-back spring to prevent knock-back is installed between the projection and the second concave portion.

6. The disc brake according to claim 1, wherein the support member is provided with a seating groove at which the flange is seated.

7. The disc brake according to claim 6, wherein:
the pull-rod is provided with a plurality of supporting protrusions adapted to be equally spaced from each other along an outer circumferential surface of the flange and protrude in a radial direction of the pull-rod; and
the seating groove of the supporting member is provided with a plurality of support grooves corresponding to the supporting protrusions at positions corresponding to the supporting protrusions.

8. The disc brake according to claim 7, wherein leading end surfaces of the supporting protrusions and a leading end surface of the support member supporting the high-pressure spring are arranged in a stepped manner such that the leading end surface of the support member protrudes further in a direction of forward movement of the piston than the leading end surfaces of the supporting protrusions.

9. The disc brake according to claim 7, wherein the flange is provided with a recess recessed to support the low-pressure spring.

10. The disc brake according to claim 1, wherein a distance between threads of the adjuster and the pull-rod which are screw-coupled with each other decreases to allow the adjuster to be closely combined with the pull-rod.

11. The disc brake according to claim 1, wherein a hydraulic duct to receive hydraulic brake pressure to be applied to the piston is provided at one end of the caliper housing.

* * * * *